United States Patent
Krames et al.

(10) Patent No.: US 12,488,457 B2
(45) Date of Patent: Dec. 2, 2025

(54) METHOD OF OPERATING A MEDICAL IMAGING SYSTEM, METHOD OF SIMULATING A PARTIAL DEFORMATION OF A THREE-DIMENSIONAL MODEL OF AN ORGAN, MEDICAL IMAGING SYSTEM AND SOFTWARE PROGRAM PRODUCT

(71) Applicant: OLYMPUS CORPORATION, Tokyo (JP)

(72) Inventors: Lorena Krames, Koblenz (DE); Per Suppa, Hamburg (DE)

(73) Assignee: OLYMPUS CORPORATION, Tokyo (JP)

( * ) Notice: Subject to any disclaimer, the term of this patent is extended or adjusted under 35 U.S.C. 154(b) by 730 days.

(21) Appl. No.: 17/939,686

(22) Filed: Sep. 7, 2022

(65) Prior Publication Data

US 2023/0113384 A1 Apr. 13, 2023

Related U.S. Application Data

(60) Provisional application No. 63/254,624, filed on Oct. 12, 2021.

(51) Int. Cl.
*G06T 7/00* (2017.01)
*G06T 7/11* (2017.01)

(52) U.S. Cl.
CPC ............. *G06T 7/0012* (2013.01); *G06T 7/11* (2017.01); *G06T 2207/20081* (2013.01); *G06T 2207/20084* (2013.01); *G06T 2207/30004* (2013.01)

(58) Field of Classification Search
CPC ............. G06T 7/0012; G06T 7/11; G06T 2207/20081; G06T 2207/20084; G06T 2207/30004
See application file for complete search history.

(56) References Cited

U.S. PATENT DOCUMENTS

| | | | |
|---|---|---|---|
| 11,204,605 B1* | 12/2021 | Allais | G05D 1/0238 |
| 11,656,629 B1* | 5/2023 | Armstrong-Crews | G01S 17/88 701/25 |
| 12,156,702 B2* | 12/2024 | Siemionow | A61B 90/361 |
| 2003/0144890 A1* | 7/2003 | Dan | G06Q 30/02 705/5 |

(Continued)

OTHER PUBLICATIONS

G. Yang, et al., Upgrading Optical Flow to 3D Scene Flow through Optical Expansion, Proceedings of the IEEE/CVF Conference on Computer Vision and Pattern Recognition (CVPR), 2020, pp. 1334-1343.

(Continued)

*Primary Examiner* — Kevin Ky
(74) *Attorney, Agent, or Firm* — Scully, Scott, Murphy & Presser, P.C.

(57) ABSTRACT

A method of estimating a partial deformation of an organ in which point clouds are calculated from intraoperative image data captured before and after a partial deformation motion of an organ. Geometric feature vectors are assigned to unmoving points, whose position does not change due to the partial deformation motion. Difference vectors indicating the change of the geometric feature vectors due to a change of position of moving in proximity to the unmoving points are utilized to estimate the partial deformation motion of the organ.

20 Claims, 4 Drawing Sheets

(56) References Cited

U.S. PATENT DOCUMENTS

| | | | |
|---|---|---|---|
| 2013/0083972 A1* | 4/2013 | Ko | G06V 20/52 |
| | | | 382/107 |
| 2016/0299920 A1* | 10/2016 | Feng | G06V 10/7625 |
| 2018/0153621 A1* | 6/2018 | Duindam | G06T 19/20 |
| 2018/0307924 A1* | 10/2018 | Zeng | G06V 10/46 |
| 2020/0138518 A1* | 5/2020 | Lang | A61B 17/1666 |
| 2021/0096241 A1* | 4/2021 | Bongio Karrman | G06V 10/82 |
| 2021/0137634 A1* | 5/2021 | Lang | A61B 90/00 |
| 2022/0137227 A1* | 5/2022 | Armstrong-Crews | B60W 30/0956 |
| | | | 701/26 |
| 2022/0137633 A1* | 5/2022 | Chen | G01C 11/04 |

OTHER PUBLICATIONS

R. B. Rusu, et al., Fast Point Feature Histograms (FPFH) for 3D registration, 2009 IEEE International Conference on Robotics and Automation.

X. F. Han, et al., A comprehensive review of 3D point cloud descriptors, arXiv:1802.02297v1 [cs.CV] Feb. 7, 2018.

* cited by examiner

METHOD OF OPERATING A MEDICAL IMAGING SYSTEM, METHOD OF SIMULATING A PARTIAL DEFORMATION OF A THREE-DIMENSIONAL MODEL OF AN ORGAN, MEDICAL IMAGING SYSTEM AND SOFTWARE PROGRAM PRODUCT

CROSS-REFERENCE TO RELATED APPLICATION

The present application is based upon and claims the benefit of priority from U.S. Provisional Application No. 63/254,624 filed on Oct. 12, 2021, the entire contents of which is incorporated herein by reference.

BACKGROUND

Field

The present disclosure relates to a method of operating a medical imaging system to estimate a partial deformation of an organ. The present disclosure further relates to a method of simulating a partial deformation of a three-dimensional model of an organ, a medical imaging system and a software program product.

Prior Art

Surgeries with a laparoscope, also known as laparoscopic surgeries or laparoscopies, offer a number of advantages compared to traditional open surgeries, e.g., smaller incisions and a shorter recovery time. In laparoscopic surgery, intraoperative navigation plays a crucial role. However, there are a number of difficulties involved in this kind of navigation. The organ cannot be touched, so that haptic feedback is unavailable to the surgeon. Thus, the position of a tumour cannot be felt. In addition, laparoscopic ultrasound is the only available technique to visualize subsurface structures, e.g., veins, arteries and tumours, under the surface of the target organ. Laparoscopic ultrasound usually only provides 2D images which need to be integrated in the surgeon's mind to refer to the actual position of the 2D ultrasound slice in 3D space.

In order to solve this problem, preoperative image data of the organ, for example a computer tomography (CT) image or a magnetic resonance (MR) image, is often captured before the operation. This preoperative image data is transformed into a three dimensional model of the organ, which is then aligned with the intraoperative laparoscopic image data, so that additional information from the preoperative image can be added to the intraoperative image. The alignment of the model with the intraoperative image is called image registration.

However, in the preoperative image data the organ is represented in its natural undeformed state. In comparison, during laparoscopic surgery the target organ is usually subject to deformation due to the pressure induced by the insufflation gas. Additionally, due to the restricted space in the abdominal cavity, mobilization techniques are required to move parts of the target organ into a suitable position for resection. These mobilization techniques involve a partial deformation of the organ as well. Thus, before registration the partial deformation of the organ needs to be applied to the model to receive accurate registration results.

Biomechanical modelling based on the finite element method is often used to simulate the deformations. However, these biomechanical models require an a priori knowledge of several parameters including the stiffness of the organ. If these parameters are not known and deviate from standard values, for example due to a disease of the organ, this approach fails to predict accurate results for the deformation.

Another approach utilizes intraoperative imaging techniques such as CT fluoroscopy to model the deformation. However, to achieve a correspondence between the intraoperative images and the preoperative images, fiducial markers have to be placed on the organ prior to the preoperative imaging, which requires an additional surgical step. In addition, a cone-beam CT device is required during the laparoscopic surgery. Also, the registration of the fluoroscopic image with the intraoperative surface requires a 2D to 3D registration approach which is usually technically more difficult than a 3D-to-3D registration.

SUMMARY

It is an object to provide an easy, fast, reliable and inexpensive way to estimate partial deformations of an organ, such as during laparoscopic surgery.

Such object can be solved by a method of operating a medical imaging system to estimate a partial deformation of an organ, wherein the medical imaging system comprises a processor, wherein the processor is configured to:
  receive first intraoperative image data of the organ captured at a first point in time and second intraoperative image data of the organ captured at a second point in time, wherein the first point in time is prior to a partial deformation motion of the organ and the second point in time is after the partial deformation motion of the organ,
  calculate a first intraoperative point cloud from the first intraoperative image data and a second intraoperative point cloud from the second intraoperative image data, wherein the first intraoperative point cloud comprises information about a spatial position of image points representing an organ surface at the first point in time and wherein the second intraoperative point cloud comprises information about the spatial position of the image points representing the organ surface at the second point in time,
  classify at least one image point in the first intraoperative point cloud and its corresponding point in the second intraoperative point cloud as an unmoving point, wherein the spatial position of the unmoving point is the same at the first point in time and the second point in time,
  calculate and assign a geometric feature vector to the at least one unmoving point in both the first and second intraoperative point clouds, wherein the geometric feature vector of an unmoving point is indicative of at least one geometric relation of said unmoving point to at least one of its neighboring image points,
  calculate a difference vector for the at least one unmoving point, wherein the difference vector is the difference between the geometric feature vector at the first point in time and the geometric feature vector at the second point in time,
  set at least one image point in the first intraoperative image data as a neighboring moving point, wherein the neighboring moving point is situated in a predefined space centered on the at least one unmoving point and wherein the spatial position of the neighboring moving point changes between the first point in time and the second point in time, estimate a position change of the at least one neighboring moving point from the difference vector of at least one unmoving point and utilize the position change to estimate the partial deformation of the organ.

With such method the partial deformation of the organ can be estimated without the need of additional imaging techniques and without the knowledge of organ specific parameters, for example its mechanical stiffness. First intraoperative image data can be captured prior to the partial deformation at a first point in time and second intraoperative image data can be captured after the partial deformation at a second point in time. Both first and second intraoperative image data can be transformed into point clouds. This can allow the system to track which points change their spatial position, i.e., the moving points, and which points do not change position, i.e., the unmoving points.

The processor can classify the image points in the first intraoperative point cloud and the second intraoperative point cloud as unmoving points by comparing the spatial positions of the image points in both point clouds and classifying those image points as unmoving points, which have identical spatial positions in both point clouds. Image points not classified as unmoving points can be classified as moving points instead.

In this specification, an image point in the second intraoperative image data is a corresponding point to an image point in the first intraoperative point cloud, if the image point in the second intraoperative point cloud is representing the same part of the organ surface as the image point in the first intraoperative point cloud.

After classifying the unmoving point or points, the system can assign a geometric feature vector to the unmoving point or points in both point clouds. A geometric feature vector represents the geometric relations of an image point in relation to its neighboring points. The geometric relations represented are for example the orientation of its surface normal, the angle between its surface normal and neighboring surface normals or the distance to neighboring points in 3D space.

The geometric feature vector can comprise a number of vector components corresponding to the number of geometric relations it indicates. A value of every vector component can be indicative of a number of neighboring points to which the corresponding geometric relation applies.

A neighboring point of a first image point can be an image point, which is situated in a predefined space centered on the first image point. By changing the size of the predefined space, the sensitivity of the geometric feature vector of the first image point to its surrounding can be influenced. The predefined space can be a circle or a sphere with a predefined radius centered on the unmoving point. The value of the predefined radius may be set by a user depending on the circumstances.

The method recognizes that the geometric feature vector of a point in a point cloud is dependent on its neighboring points. Even the geometric feature vector of an unmoving point will change if at least one of its neighboring points changes position, i.e., is a moving point. Thus, by determining the change of the geometric feature vector, i.e., the difference vector, the change of the spatial position of the neighboring moving points can be estimated. In this way, it is possible to estimate the partial deformation motion of the organ by examining only the unmoving points and their difference vectors. It is not necessary to track the motion of the moving points itself.

The recognition of the partial deformation motion is made easier by the fact that the mobilization steps are highly standardized. This means that each typical partial deformation motion results in a characteristic change of the geometric feature vectors of the unmoving points. By recognizing these characteristic changes of the geometric feature vectors, the system can easily deduce the partial deformation motion. The partial deformation motion can be estimated by integration of the difference vectors of multiple unmoving points in proximity to the deformed part of the organ.

According to an embodiment, in order to estimate the position change of the at least one neighboring moving point, the processing unit simulates changes of the spatial position of the at least one neighboring moving point until the resulting change in the geometric feature vector matches the difference vector.

Multiple unmoving points can be classified, assigned geometric feature vectors and utilized to estimate the position change of at least one of its neighboring moving point, such as all of its neighboring moving points. According to an embodiment, the processing unit calculates and assigns a geometric feature vector to every point in the first intraoperative point cloud and/or the second intraoperative point cloud.

The difference vector can be calculated by subtracting the geometric feature vector at the second point in time from the geometric feature vector at the first point in time or vice versa. The difference vectors of multiple unmoving points in proximity to a moved part of the organ can be calculated and utilized to estimate the position change of their neighboring moving points. A change in the geometric feature vector will be most prominent in unmoving points in proximity to a partially deformed part of the organ. Thus, unmoving points in the proximity to the partially deformed part of the organ can be chosen to estimate the partial deformation motion.

The geometric feature vector and/or the difference vector may be represented as histograms. The calculation and evaluation of the difference vectors may thus be a histogram analysis.

In order to calculate the first intraoperative point cloud and/or the second intraoperative point cloud, optical and/or electronic markers can be placed on the organ surface and the position of the markers can be determined with a tracking system, wherein the processing unit utilizes the position of the markers to calculate the position of the image points of the first intraoperative point cloud and/or the second intraoperative point cloud.

In this way, the processing unit gains access to depth information of the image points in the first and second intraoperative image data. This depth information is utilized to calculate the point clouds.

According to an embodiment the medical image processing system comprises an intraoperative image acquisition device to record intraoperative image data, such as the first intraoperative image data and/or the second intraoperative image data, and to transmit the intraoperative image data to the processor, wherein the intraoperative image acquisition device can be a stereo image acquisition device, wherein the stereo image acquisition device can record the intraoperative image data as stereo intraoperative image data comprising depth information about its image points, wherein the depth information can be utilized to calculate the first intraoperative point cloud and/or the second intraoperative point cloud.

The intraoperative image acquisition device can be a laparoscope or an endoscope. The surgeon utilizes the intraoperative image acquisition device to capture image data during an operation. By using a stereo image acquisition device, depth information about the image points may be acquired that is utilized to calculate the point clouds.

The processor can receive multiple sets of intraoperative image data captured at different points in time, wherein the processor can detect the partial deformation motion in the sets of intraoperative image data by comparing the sets of intraoperative image data, wherein the processor can classify a set of intraoperative image data captured before the partial deformation motion as the first intraoperative image data and a set of intraoperative image data captured after the partial deformation motion as the second intraoperative image data.

The image data received by the processor may be an intraoperative image data stream captured by the intraoperative image acquisition device. From the intraoperative image data stream, an image captured before the partial deformation motion can be set as the first intraoperative image data and an image captured after the partial deformation motion can be set as the second intraoperative image data. All sets of intraoperative image data can be captured from the same point of view. In other words, the intraoperative image acquisition device is not moved, rotated or tilted in any way while the intraoperative image data is captured.

The processor can utilize optical flow and/or optical expansion to detect the partial deformation motion in the sets of intraoperative image data.

With optical flow and/or optical expansion methods moving parts in the intraoperative laparoscopic view can be detected. These methods are known in the art and are for example described in "G. Yang, D. Ramanan, Upgrading Optical Flow to 3D Scene Flow through Optical Expansion, Proceedings of the IEEE/CVF Conference on Computer Vision and Pattern Recognition (CVPR), 2020, pp. 1334-1343". Optical flow and/or optical expansion can be utilized to classify image points as moving points and/or unmoving points.

The processor can receive multiple sets of intraoperative image data captured at different points in time, wherein the processor can receive a time signal indicating the completion of the partial deformation motion, wherein the processor can classify a set of intraoperative image data captured after the receipt of the time signal as the second intraoperative image data, wherein the processor can classify a set of intraoperative image data captured before the receipt of the time signal as the first intraoperative image data.

The time signal may be generated by pressing a button. In this way, the surgeon can indicate the completion of the mobilization steps, i.e., the partial deformation motion. In this way the generation and transmission of the time signal offers a fast and simple way to indicate the first point in time and the second point in time. A second time signal can be received by the processor before the partial deformation motion has begun, wherein the processor can classify a set of intraoperative image data captured before the receipt of the second time signal as the first intraoperative image data.

The geometric feature vector can be calculated and assigned to the at least one unmoving point with a feature descriptor program, such as a fast point feature histogram descriptor program.

Feature descriptor programs, also known as feature descriptors, calculate and assign geometric feature vectors to image points. The feature descriptor program can be a 3D point cloud descriptor. An example for a 3D point cloud descriptor is the fast point feature histogram descriptor known from "R. B. Rusu, N. Blodow and M. Beetz, Fast Point Feature Histograms (FPFH) for 3D registration, 2009 IEEE International Conference on Robotics and Automation". Other types of 3D point cloud descriptor are for example the Signature of Histogram of Orientation (SHOT) descriptor or the Spin Image descriptor. An overview of different types of 3D point cloud descriptors can be found in "X. F. Han, J. S. Jin, J. Xie, M. J. Wang, W. Jiang, A comprehensive review of 3D point cloud descriptors, arXiv: 1802.02297v1 [cs.CY] 7 Feb. 2018".

According to an embodiment, the position change of the at least one neighboring moving point and/or the partial deformation of the organ can be estimated with an artificial neural network, such as a deep learning network.

The artificial neural network can be trained with characteristic difference vectors resulting from typical partial deformation motions. In this way, the artificial neural network can learn to recognize the partial deformation motions quickly and reliably. The utilization of an artificial neural network can greatly simplify the task of the estimation of the position change of the at least one neighboring moving point and/or the partial deformation of the organ.

The artificial neural network can be trained in recognizing patterns of the difference vectors of a plurality of unmoving points resulting from the partial deformation motion of the organ.

From these patterns the artificial neural network can infer to the partial deformation motion. The patterns may be obtained by a histogram analysis of the difference vectors. By analyzing patterns of difference vectors, the task of deformation modelling can be disassembled into a pattern recognition task, which is well suited to be solved by artificial neural networks.

Such object can be further solved by a method of simulating a partial deformation of a three dimensional model of an organ with a medical image processing system, wherein the partial deformation is estimated with a method of operating a medical imaging system according to one of the aforementioned embodiments, wherein the medical image processing system comprises a processor and a memory having stored thereon the model, the model being derived from preoperative image data of the organ in an undeformed state, wherein after estimating the partial deformation of the organ the processor is configured to:

estimate a non-rigid transformation matrix by utilizing the position change of the at least one neighboring moving point, wherein the non-rigid transformation matrix reproduces the partial deformation motion of the organ when applied to the model, and apply the non-rigid transformation matrix to the model to correct the model for the partial deformation of the organ.

The same or similar advantages apply to the method of simulating a partial deformation of a three dimensional model as previously mentioned with respect to the method of operating a medical imaging system.

With the method of simulating the partial deformation of the three-dimensional model, the partial deformation visible in the intraoperative image can be applied to the model, so that it is possible to overlay the model onto the intraoperative image to enrich it with additional information. The use of the standardized mobilization steps can simplify the estimation of the non-rigid transformation matrix, as the number of partial deformations is limited. The model can be calculated from preoperative CT and/or MR image data. The model can be a preoperative point cloud.

Every image point in the model can be correlated to a corresponding image point in the second intraoperative point cloud, such as by assigning geometric feature vectors to the image points in the model and the image points in the second intraoperative point cloud and register the second intraoperative point cloud to the model based on similarity of the respective geometric feature vectors.

By correlating the image points in the model with corresponding image points in the second intraoperative point cloud, the partial deformation estimated in the intraoperative point clouds can be easily transferred to the model. Applying geometric feature vectors to the image points, such as in combination with a global registration algorithm, is a fast and effective way to establish point correspondence between the preoperative model and the intraoperative point cloud or clouds.

The non-rigid transformation matrix can be estimated via an artificial neural network, such as a deep learning network.

The artificial neural network can be trained to estimate the non-rigid transformation matrix directly from the difference vectors of the at least one unmoving point. In doing so, the artificial neural network can also estimate the position change of the neighboring moving point and the partial deformation of the organ. In other words, the tasks of the estimation of the position change of the neighboring moving points, of the partial deformation of the organ and of the non-rigid transformation matrix can be carried out by the same artificial neural network. By calculating the non-rigid transformation matrix, the neural network can simultaneously estimate the position change and the partial deformation motion.

The artificial neural network can be trained with datasets comprising non-rigid transformation matrices corresponding to different partial deformation motions of the organ and difference vectors corresponding to these partial deformation motions.

By training the artificial neural network in this way, it can learn to recognize the patterns associated with different partial deformation motions or mobilization steps.

Such object can be further solved by a medical image processing system comprising a processor, wherein the medical image processing system is configured to carry out a method of operating a medical imaging system according to any of the previously mentioned embodiments and/or a method of simulating a partial deformation of a three dimensional model of an organ according to any of the previously mentioned embodiments.

The same or similar advantages apply to the medical image processing system as previously mentioned with respect to the method of simulating a partial deformation of a three dimensional model and the method of operating a medical imaging system.

such object can be further solved by a software program product comprising program code means for a medical image processing system according to any of the previously mentioned embodiments, comprising a control program component that is executed in the processor of the medical image processing system, wherein the control program component is configured to carry out a method according to any of the previously mentioned embodiments when it is executed in the processor.

The same or similar advantages apply to the software program product as previously mentioned with respect to the medical image processing system, the method of simulating a partial deformation of a three dimensional model and the method of operating a medical imaging system.

BRIEF DESCRIPTION OF THE DRAWINGS

Further characteristics will become apparent from the description of the embodiments together with the claims and the included drawings. Embodiments can fulfill individual characteristics or a combination of several characteristics.

The embodiments are described below, without restricting the general intent of the invention, based on the exemplary embodiments, wherein reference is made expressly to the drawings with regard to the disclosure of all details that are not explained in greater detail in the text. In the drawings.

DETAILED DESCRIPTION

Figure 1:
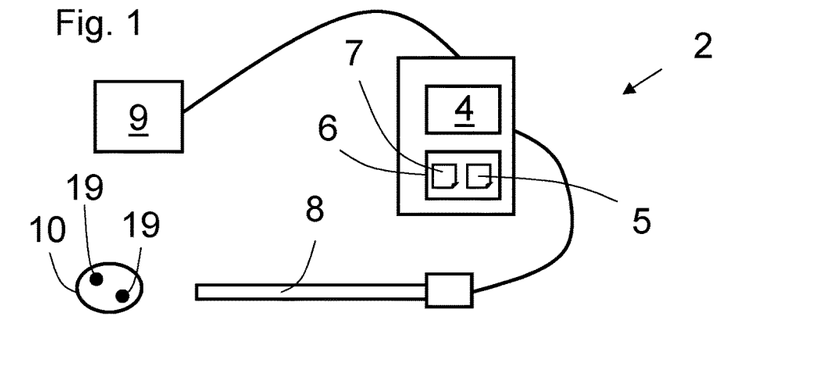
FIG. 1 illustrates a schematic simplified representation of a medical image processing system.

FIG. 1 shows a schematic representation of an exemplary embodiment of a medical imaging system 2, which is configured to estimate a partial deformation of an organ 10. The system 2 comprises a processing unit (e.g., processor) 4, for example a CPU or a similar device, a storage unit (e.g., memory) 6, an intraoperative image acquisition device 8 and a tracking system 9. The storage unit 6 is configured to store data. A three dimensional model 7, derived from preoperative image data, is stored on the storage unit 6. The intraoperative image acquisition device 8 is for example a laparoscope or an endoscope (e.g., having a CCD or CMOS image sensor).

A software program product 5 stored on the storage unit 6 and executed by the processing unit 4 may be utilized to perform a method of operating the medical imaging system 2 to estimate a partial deformation of an organ 10 and/or a method of simulating a partial deformation of the three dimensional model 7 of the organ 10 as described in the following.

The intraoperative image acquisition device 8 captures intraoperative image data during an intraoperative operation and transmits it to the processing unit 4. The processing unit 4 calculates point clouds from individual intraoperative images or an intraoperative image stream comprising multiple intraoperative images.

In order to receive the depth information about the image points necessary to calculate the point clouds, according to the shown embodiment, the tracking system 9 is utilized to track the positions of markers 19 placed on the organ 10. The markers 19 may be electronic and/or optical markers that allow the tracking system 9 to determine the position of the markers 19 in three dimensional space. The tracking system 9 transmits this information to the processing unit 4.

When using optical markers, the tracking system can be a 3D camera (also known as stereo camera), which tracks the position of the markers and transmits them to the processor. The 3D camera may be controlled by the processing unit 4 or by a separate processor. The details of such a camera setup are known in the art. Alternatively, the depth information is acquired by a stereo intraoperative image acquisition device 8.

Electronic markers can be electromagnetic markers. The electromagnetic markers are placed on the surface. The tracking system comprises a field generator and a processor, which can be the processing unit 4 or a separate processor. The field generator emits an electromagnetic field, which induces a current in the electromagnetic marker. The current is relayed to the processor, which calculates the position of each electromagnetic marker based on the current. The model 7, which may also be a point cloud, is aligned and overlaid onto the intraoperative image data to enrich the intraoperative images with additional information. This requires that the organ 10 represented by the model matches the organ 10 in the intraoperative images. However, due to partial deformation of the organ during intraoperative surgery this may not be the case, as will be explained in FIGS. 2 and 3.

Figure 2:
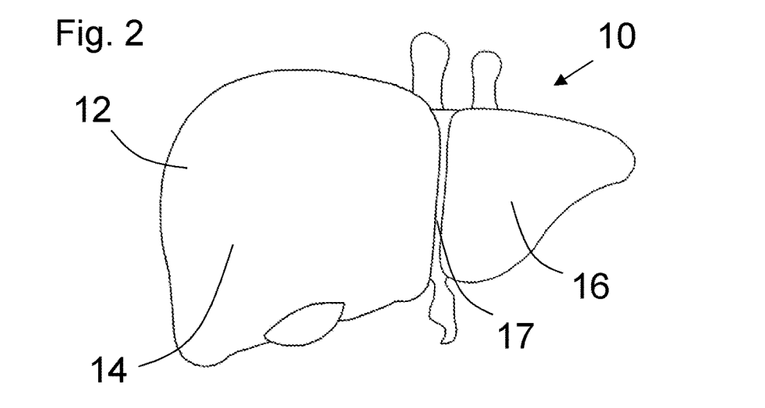
FIG. 2 illustrates a schematic simplified representation of an intraoperative image of a liver before a partial deformation motion.

FIG. 2 shows a schematic representation of an organ, in this case a liver, with an organ surface 12. The liver comprises a right side 14 and a left side 16 divided by the falciform ligament 17. During laparoscopic surgery, due to the restricted space in the abdominal cavity, mobilization techniques are required to move parts of the organ 10 into a suitable position for resection. For example, the left side 16 of the liver is folded up to better access parts of the liver not visible otherwise.

Figure 3:
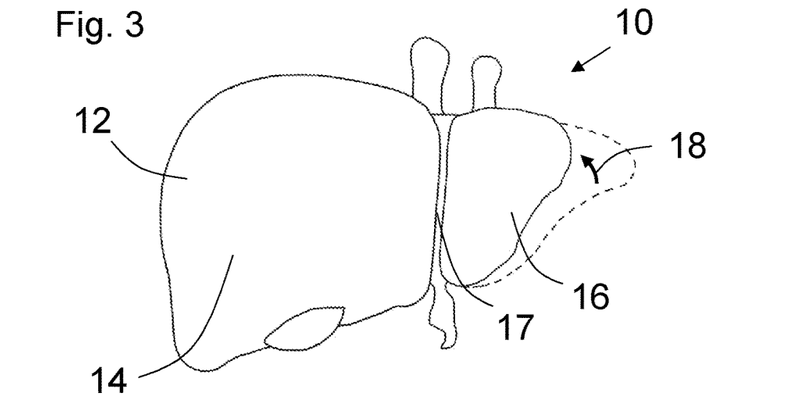
FIG. 3 illustrates a schematic simplified representation of an intraoperative image of a liver after a partial deformation motion.

Such a partial deformation motion 18 involving an upward motion of the left part 16 is schematically represented in FIG. 3. However, the motion 18 shown in FIG. 3 is purely schematic and not meant to be restricted to any specific mobilization steps performed by surgeons. As can be seen in FIG. 3, due to the partial deformation motion 18, the position of the left side 16 is changed, while the right side 14 stays immobile due to the falciform ligament 17 acting as a tilt axis.

When performing the mobilization steps during intraoperative surgery, the organ 10 will be partially deformed. In order to align and overlay the preoperative model 7 depicting the undeformed organ 10 onto the intraoperative image data depicting the deformed organ 10, the model 7 has to be corrected for the partial deformation. In order to do so, the partial deformation motion has to be recognized and an appropriate correction applied to the model 7.

Figure 4:
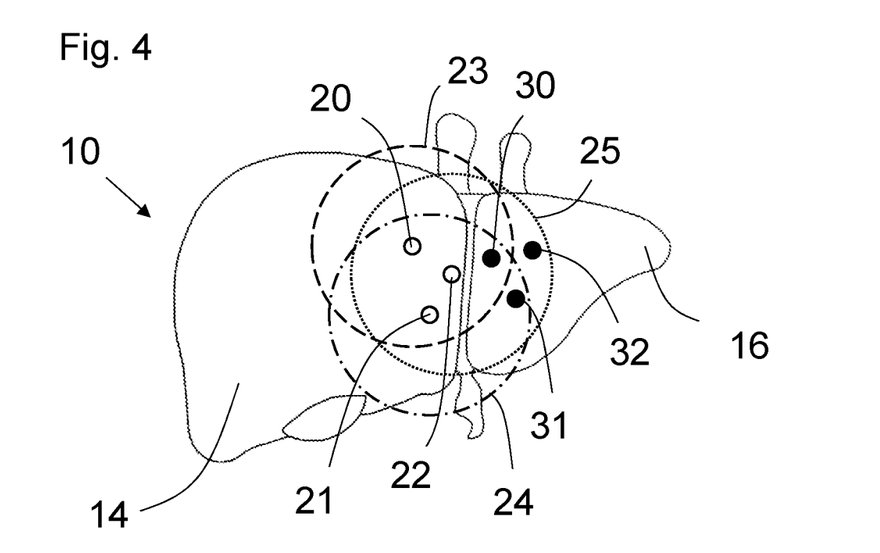
FIG. 4 illustrates a schematic simplified representation of several points of a point cloud, the point cloud representing a liver before a partial deformation motion.
Figure 5:
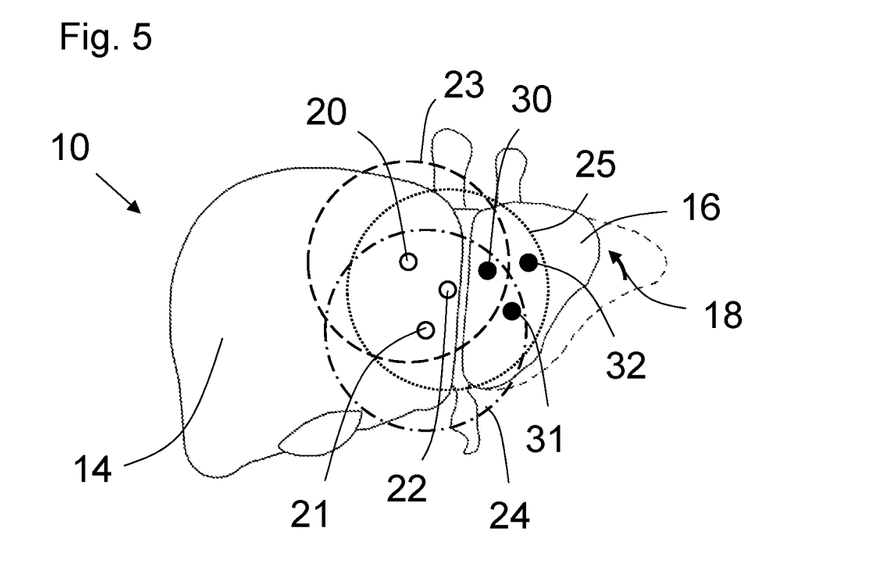
FIG. 5 illustrates a schematic simplified representation of several points of a point cloud, the point cloud representing a liver after a partial deformation motion.

A method of operating the medical imaging system 2 to estimate the partial deformation of an organ 10 is explained in the following in connection with FIGS. 4 to 9c. FIG. 4 shows a first intraoperative point cloud depicting the surface of the organ 10 in an undeformed state. The first intraoperative point cloud is calculated by the processing unit 4 from intraoperative image data captured by the intraoperative image acquisition device 8 prior to the partial deformation motion. A number of points 20, 21, 22 of the point cloud are indicated on the right side 14 and a number of points 30, 31, 32 are indicated on the left side 16 of the organ 10. Due to the partial deformation motion 18, the points 30, 31, 32 will be moved upwards, while the spatial position of the points 20, 21, 22 will remain unchanged, as shown in FIG. 5. Therefore, the points 30, 31, 32 are classified as moving points 30, 31, 32, while the points 20, 21, 22 are classified as unmoving points 20, 21, 22.

A feature descriptor program assigns a geometric feature vector to the unmoving points 20, 21, 22. Such a geometric feature vector indicates different geometric relations of the unmoving points 20, 21, 22 to their neighboring points. For example, the geometric relations of a point may be the orientation of its surface normal, the angle between its surface normal and the neighboring point's surface normals or the distance to the neighboring points in 3D space. The neighboring points of any given point are defined as those points, which are inside a predefined space 23, 24, 25 centered on the given point. In FIGS. 4 and 5, the predefined spaces 23, 24, 25 are circles or spheres with a certain radius centered on the unmoving points 20, 21, 22. The radius may be changed as required to change the sensitivity of the unmoving points 20, 21, 22 to their surroundings.

In order to estimate the partial deformation motion 18, the change in the geometric feature vectors assigned to the unmoving points 20, 21, 22 between the first point in time shown in FIG. 4 and the second point in time shown in FIG. 5 is calculated. Although the spatial position of the unmoving points 20, 21, 22 remains unchanged, their geometric feature vector will change as long as the position of at least one of their neighboring points changes. As can be seen in FIGS. 4 and 5, the predefined space 23 of the unmoving point 20, represented by a dashed line, includes the unmoving points 21, 22 and the moving point 30. The predefined space 24 of the unmoving point 21, represented by a dashed and dotted line, includes the unmoving points 20, 22 and the moving points 30, 31. The predefined space 25 of the unmoving point 22, represented by a dotted line, includes the unmoving points 20, 21 and all moving points 30, 31, 32.

Figure 6:
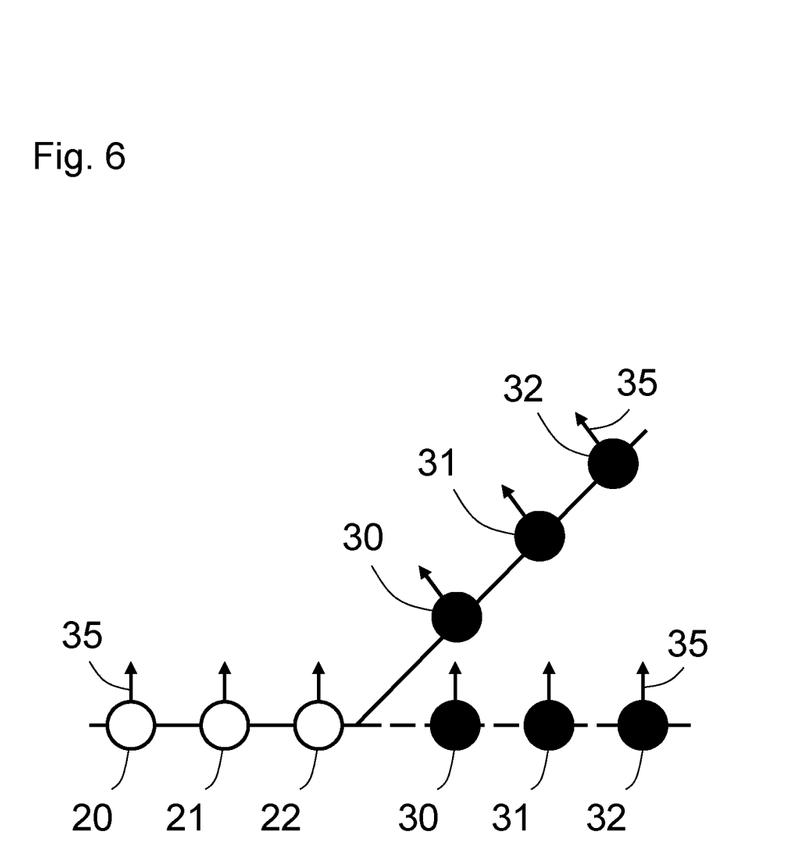
FIG. 6 illustrates a schematic simplified representation of the change of position and surface normal of several of the points from FIGS. 4 and 5, FIGS. 7a to 7c illustrate histograms representing the geometric feature vector of a first unmoving point from FIGS. 4 and 5 at a first point in time (7a) and a second point in time (7b) as well as a histogram of the difference vector (7c)

The change of their positions and their surface normals 35 of the moving points 30, 31, 32 due to the partial deformation motion 18 is schematically shown in FIG. 6. As can be seen, the positions and surface normals 35 of the unmoving points 20, 21, 22 stay the same. The moving points 30, 31, 32 are positioned at approximately the same plane as the unmoving points 20, 21, 22 at the first point in time, represented by a dashed line. However, at the second point in time, represented by a solid line, the moving points 30, 31, 32 are moved upwards. At the same time, the surface normals 35 of the moving points 30, 31, 32 are tilted to the left side due to the partial deformation motion 18.

Figure 7A:
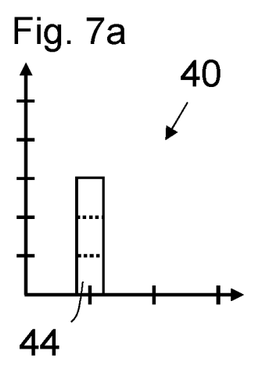

These changes of position and their surface normal 35 of the moving points 30, 31, 32 are indicated in the geometric feature vectors of the unmoving points, as shown in FIGS. 7a to 9c. FIG. 7a shows the geometric feature vector 40 of the unmoving point 20 at the first point in time, before the partial deformation motion. The geometric feature vector 40 is represented as a histogram. Each marker on the abscissa in the histogram represents another vector component of the geometric feature vector 40 and thus another geometric relation indicated by the feature vector 40. The ordinate represents the number of neighboring points to which these geometric relations apply. As can be seen in FIGS. 4 and 5, the predefined space 23 of unmoving point 20 includes the points 21, 22 and 30, a total of three points. As the direction of the surface normal 35 of the three points 21, 22 and 30 is the same at the first point in time, as shown in FIG. 6, the value of the vector component 44 indicating this geometric relation is three in FIG. 7a.

Figure 7B:
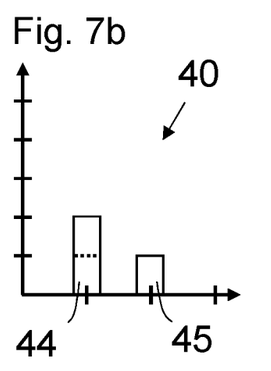

FIG. 7b depicts the geometric feature vector 40 of the unmoving point 20 at the second point in time. As the surface normal 35 of the moving point 30 changes due to the partial deformation motion 18, the value of the vector component 44 indicating a vertical surface normal changes to two, while the value of a vector component 45 indicating a tilted surface normal 35 changes to one.

Figure 7C:
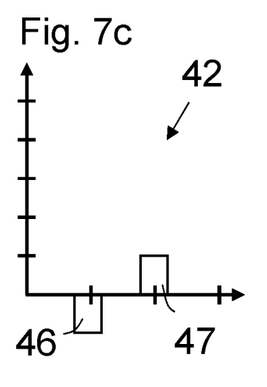

FIG. 7c depicts the difference vector 42 of the unmoving point 20. The difference vector 42 is calculated by subtracting the geometric feature vector 40 at the first point in time from the geometric feature vector 40 at the second point in time or vice versa. Thus, the difference vector 42 indicates the change in the geometric feature vector 40, indicated by the values of the vector components 46, 47.

Figure 8A:
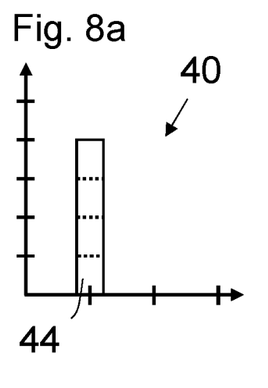
FIGS. 8a to 8c illustrate histograms representing the geometric feature vector of a second unmoving point from FIGS. 4 and 5 at a first point in time (8a) and a second point in time (8b) as well as a histogram of the difference vector (8c)
Figure 8B:
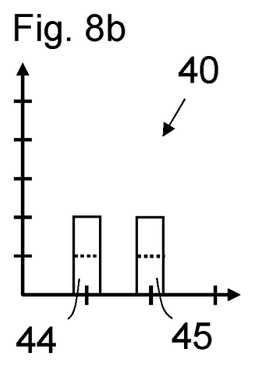
Figure 8C:
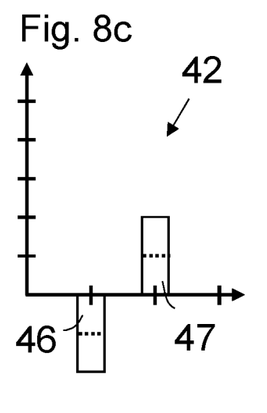
Figure 9A:
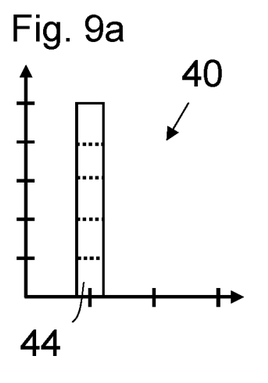
FIGS. 9a to 9c illustrate histograms representing the geometric feature vector of a third unmoving point from FIGS. 4 and 5 at a first point in time (9a) and a second point in time (9b) as well as a histogram of the difference vector (9c), In the drawings, the same or similar types of elements or respectively corresponding parts are provided with the same reference numbers in order to prevent the item from needing to be reintroduced.
Figure 9B:
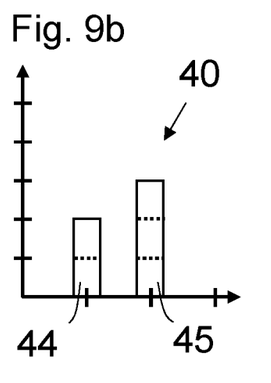
Figure 9C:
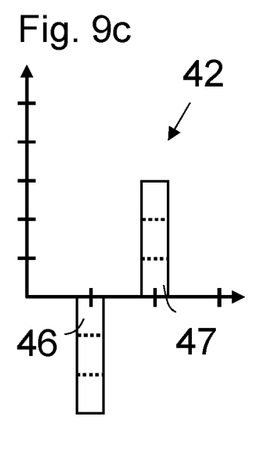

FIGS. 8a to 8c show the geometric feature vector 40 at both points in time and the difference vector 42 of the unmoving point 21. As the predefined space 24 of the unmoving point 21 includes a total of four points, the values of the vector components 44, 45, 46, 47 change accordingly. Equally, FIGS. 9a to 9c show the geometric feature vector 40 at both points in time and the difference vector 42 of the unmoving point 22, whose predefined space 25 includes a total of five points.

The number of three moving points 30, 31, 32 and three unmoving points 20, 21, 22 is only chosen for a better representability. The number of moving points 30, 31, 32 and unmoving points 20, 21, 22 may be lower or much higher than three. The geometric feature vector assigned to the unmoving points 20, 21, 22 may include any number of vector components. The number of three vector components as shown in FIGS. 7a to 9c is just exemplary. According to an embodiment, the geometric feature vectors may comprise at least ten, such as at least forty, or at least hundred vector components, each vector component indicating a different geometric relation.

By calculating the difference vectors 42 of the unmoving points 20, 21, 22, the change of position of the moving points 30, 31, 32 and thus the partial deformation motion is estimated. The knowledge of the partial deformation motion may be utilized to calculate a non-rigid transformation matrix. The non-rigid transformation matrix reproduces the partial deformation motion of the organ 10 when applied to the model 7. By applying the non-rigid transformation matrix to the model 7, the model 7 is corrected for the partial deformation of the organ 10.

According to an embodiment, an artificial neural network, e.g., a deep learning network, is trained with typical patterns of difference vectors 42 of the unmoving points 20, 21, 22 resulting from typical mobilization motions. The artificial neural network may also estimate the non-rigid transformation matrix. The estimation or calculation of the matrix may be done directly from the difference vectors 42. In this case, the estimation of the change of position of the moving points and the partial deformation motion is realized by estimating the matrix. The artificial neural network can be stored on the storage unit 6 and executed by the processing unit 4.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCES 2 medical imaging system
4 processing unit
5 software program product
6 storage unit
7 model
8 intraoperative image acquisition device
9 tracking system
10 organ
12 organ surface
14 right side
16 left side
17 falciform ligament
18 partial deformation motion
19 marker
20, 21, 22 unmoving point
23, 24, 25 predefined space
30, 31, 32 neighboring moving point
35 surface normal
40 geometric feature vector
42 difference vector
44, 45, 46, 47 value of vector component

What is claimed is:

1. A method for estimating a partial deformation of an organ, wherein the method comprises:

receiving first intraoperative image data of the organ captured at a first point in time and second intraoperative image data of the organ captured at a second point in time, wherein the first point in time is prior to a partial deformation motion of the organ and the second point in time is after the partial deformation motion of the organ, calculating a first intraoperative point cloud from the first intraoperative image data and a second intraoperative point cloud from the second intraoperative image data, wherein the first intraoperative point cloud comprises information about a spatial position of image points representing an organ surface at the first point in time and wherein the second intraoperative point cloud comprises information about the spatial position of the image points representing the organ surface at the second point in time, classifying at least one image point in the first intraoperative point cloud and its corresponding point in the second intraoperative point cloud as an unmoving point, wherein the spatial position of the unmoving point is the same at the first point in time and the second point in time, calculating and assigning a geometric feature vector to the at least one unmoving point in both the first and second intraoperative point clouds, wherein the geometric feature vector of an unmoving point is indicative of at least one geometric relation of said unmoving point to at least one of its neighboring image points, calculating a difference vector for the at least one unmoving point, wherein the difference vector is the difference between the geometric feature vector at the first point in time and the geometric feature vector at the second point in time, setting at least one image point in the first intraoperative image data as a neighboring moving point, wherein the neighboring moving point is situated in a predefined space centered on the at least one unmoving point and wherein the spatial position of the neighboring moving point changes between the first point in time and the second point in time, and estimating a position change of the at least one neighboring moving point from the difference vector of at least one unmoving point and utilizing the position change to estimate the partial deformation of the organ.

2. The method according to claim 1, wherein, the calculating of one or more of the first intraoperative point cloud and the second intraoperative point cloud comprises placing one or more of optical and electronic markers on the organ surface;

the determining of position of the markers comprises determining the position of the markers with a tracking system; and the method further comprises utilizing the position of the markers to calculate the position of the image points of one or more of the first intraoperative point cloud and the second intraoperative point cloud.

3. The method according to claim 1, wherein the receiving comprises:

recording one or more of the first intraoperative image data and the second intraoperative image data, and transmitting the recorded intraoperative image data to a processing unit.

4. The method according to claim 3, wherein the one or more of the first intraoperative image data and the second intraoperative image data is recorded as stereo intraoperative image data comprising depth information about its image points, wherein the method further comprises utilizing the depth information to calculate one or more of the first intraoperative point cloud and the second intraoperative point cloud.

5. The method according to claim 1, wherein the method further comprising:

receiving multiple sets of intraoperative image data captured at different points in time, detecting the partial deformation motion in the multiple sets of intraoperative image data by comparing the sets of intraoperative image data, and classifying a set of intraoperative image data captured before the partial deformation motion as the first intraoperative image data and a set of intraoperative image data captured after the partial deformation motion as the second intraoperative image data.

6. The method according to claim 5, wherein the method further comprises utilizing one or more of optical flow and optical expansion to detect the partial deformation motion in the multiple sets of intraoperative image data.

7. The method according to claim 1, wherein the method further comprises:

receiving multiple sets of intraoperative image data captured at different points in time, receiving a time signal indicating completion of the partial deformation motion, classifying a set of intraoperative image data captured after the receipt of the time signal as the second intraoperative image data, and classifying a set of intraoperative image data captured before the receipt of the time signal as the first intraoperative image data.

8. The method according to claim 1, wherein the calculating and assigning of the geometric feature vector to the at least one unmoving point comprises using a feature descriptor program.

9. The method according to claim 8, wherein the feature descriptor program is a fast point feature histogram descriptor program.

10. The method according to claim 1, wherein the estimating of the position change of at least one of the at least one neighboring moving point and the partial deformation of the organ comprises using an artificial neural network.

11. The method according to claim 10, wherein the artificial neural network is a deep learning network.

12. The method according to claim 10, wherein the artificial neural network is trained in recognizing patterns of the difference vectors of a plurality of unmoving points resulting from the partial deformation motion of the organ.

13. The method according to claim 1, wherein the method further comprises:

estimating a non-rigid transformation matrix by utilizing the position change of the at least one neighboring moving point, wherein the non-rigid transformation matrix reproduces the partial deformation motion of the organ when applied to a model derived from preoperative image data of the organ in an undeformed state, and applying the non-rigid transformation matrix to the model to correct the model for the partial deformation of the organ.

14. The method according to claim 13, wherein the method further comprising correlating every image point in the model to a corresponding image point in the second intraoperative point cloud.

15. The method according to claim 14 wherein, the correlating comprises assigning geometric feature vectors to the image points in the model and the image points in the second intraoperative point cloud and registering the second intraoperative point cloud to the model based on a similarity of the respective geometric feature vectors.

16. The method according to claim 13, wherein the estimating of the non-rigid transformation matrix is estimated via an artificial neural network.

17. The method according to claim 16, wherein the artificial neural network is a deep learning network.

18. The method according to claim 16, wherein the artificial neural network is trained with datasets comprising non-rigid transformation matrices corresponding to different partial deformation motions of the organ and difference vectors corresponding to the partial deformation motions.

19. A medical image processing system comprising:

a processor comprising hardware, the processor being configured to:

receive first intraoperative image data of the organ captured at a first point in time and second intraoperative image data of the organ captured at a second point in time, wherein the first point in time is prior to a partial deformation motion of the organ and the second point in time is after the partial deformation motion of the organ, calculate a first intraoperative point cloud from the first intraoperative image data and a second intraoperative point cloud from the second intraoperative image data, wherein the first intraoperative point cloud comprises information about a spatial position of image points representing an organ surface at the first point in time and wherein the second intraoperative point cloud comprises information about the spatial position of the image points representing the organ surface at the second point in time, classify at least one image point in the first intraoperative point cloud and its corresponding point in the second intraoperative point cloud as an unmoving point, wherein the spatial position of the unmoving point is the same at the first point in time and the second point in time, calculate and assign a geometric feature vector to the at least one unmoving point in both the first and second intraoperative point clouds, wherein the geometric feature vector of an unmoving point is indicative of at least one geometric relation of said unmoving point to at least one of its neighboring image points, calculate a difference vector for the at least one unmoving point, wherein the difference vector is the difference between the geometric feature vector at the first point in time and the geometric feature vector at the second point in time, set at least one image point in the first intraoperative image data as a neighboring moving point, wherein the neighboring moving point is situated in a predefined space centered on the at least one unmoving point and wherein the spatial position of the neighboring moving point changes between the first point in time and the second point in time, and estimate a position change of the at least one neighboring moving point from the difference vector of at least one unmoving point and utilizing the position change to estimate the partial deformation of the organ.

20. Non-transitory computer-readable storage medium storing instructions that cause a computer to:

receive first intraoperative image data of the organ captured at a first point in time and second intraoperative image data of the organ captured at a second point in time, wherein the first point in time is prior to a partial deformation motion of the organ and the second point in time is after the partial deformation motion of the organ, calculate a first intraoperative point cloud from the first intraoperative image data and a second intraoperative point cloud from the second intraoperative image data, wherein the first intraoperative point cloud comprises information about a spatial position of image points representing an organ surface at the first point in time and wherein the second intraoperative point cloud comprises information about the spatial position of the image points representing the organ surface at the second point in time, classify at least one image point in the first intraoperative point cloud and its corresponding point in the second intraoperative point cloud as an unmoving point, wherein the spatial position of the unmoving point is the same at the first point in time and the second point in time, calculate and assign a geometric feature vector to the at least one unmoving point in both the first and second intraoperative point clouds, wherein the geometric feature vector of an unmoving point is indicative of at least one geometric relation of said unmoving point to at least one of its neighboring image points, calculate a difference vector for the at least one unmoving point, wherein the difference vector is the difference between the geometric feature vector at the first point in time and the geometric feature vector at the second point in time, set at least one image point in the first intraoperative image data as a neighboring moving point, wherein the neighboring moving point is situated in a predefined space centered on the at least one unmoving point and wherein the spatial position of the neighboring moving point changes between the first point in time and the second point in time, and estimate a position change of the at least one neighboring moving point from the difference vector of at least one unmoving point and utilizing the position change to estimate the partial deformation of the organ.

* * * * *